(12) United States Patent
Jouet et al.

(10) Patent No.: US 10,270,957 B2
(45) Date of Patent: Apr. 23, 2019

(54) METHOD AND APPARATUS FOR GENERATING AN ADAPTED SLICE IMAGE FROM A FOCAL STACK

(71) Applicant: INTERDIGITAL CE PATENT HOLDINGS, Paris (FR)

(72) Inventors: Pierrick Jouet, Rennes (FR); Valter Drazic, Betton (FR); Philippe Robert, Rennes (FR); Benoit Vandame, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/975,766

(22) Filed: Dec. 19, 2015

(65) Prior Publication Data

US 2016/0182813 A1    Jun. 23, 2016

(30) Foreign Application Priority Data

Dec. 19, 2014 (EP) ..................... 14307106

(51) Int. Cl.
*H04N 5/232* (2006.01)
*H04N 5/222* (2006.01)
(Continued)

(52) U.S. Cl.
CPC .......... *H04N 5/23212* (2013.01); *G06T 5/50* (2013.01); *G06T 7/557* (2017.01); *G06T 7/571* (2017.01);
(Continued)

(58) Field of Classification Search
CPC .. H04N 5/2353; H04N 5/23212; H04N 5/265; H04N 5/2351; H04N 5/2226;
(Continued)

(56) References Cited

U.S. PATENT DOCUMENTS 7,262,798 B2 * 8/2007 Stavely ................. H04N 5/232
348/140
2001/0045982 A1 * 11/2001 Okisu .................. H04N 5/2625
348/211.99
(Continued)

FOREIGN PATENT DOCUMENTS

DE          19632637      2/1998
EP           2403234      1/2012
WO      WO2014193377    12/2014

OTHER PUBLICATIONS

Atanassov et al., "Content-Based Depth Estimation in Focused Plenoptic Camera", Three-Dimensional Imaging, Interaction, and Measurement, SPIE International Society of Optical Engineering, vol. 7864, 2011, pp. 1-10.
(Continued)

*Primary Examiner* — Sinh Tran
*Assistant Examiner* — Tuan Le
(74) *Attorney, Agent, or Firm* — Lily Neff

(57) ABSTRACT

A method for generating an adapted slice image from a focal stack of refocused images using an all-in-focus image derived from the focal stack comprises: selecting a slice image in the focal stack; selecting at least one object in the all-in-focus image to be focused in the adapted slice image; and generating the adapted slice image by combining the selected at least one object in the all-in-focus image onto the selected slice image.

11 Claims, 6 Drawing Sheets

(51) Int. Cl.
- *G06T 5/50* (2006.01)
- *G06T 15/20* (2011.01)
- *G06T 7/571* (2017.01)
- *G06T 7/557* (2017.01)

(52) U.S. Cl.
CPC ........... *G06T 15/205* (2013.01); *H04N 5/222* (2013.01); *H04N 5/2226* (2013.01); *G06T 2200/21* (2013.01); *G06T 2207/10024* (2013.01); *G06T 2207/10028* (2013.01); *G06T 2207/10052* (2013.01); *G06T 2207/20108* (2013.01); *G06T 2207/20221* (2013.01)

(58) Field of Classification Search
CPC ..... G06T 7/571; G06T 7/0069; G06T 15/205; G06T 5/50; G06T 2207/20108; G06T 2207/10028; G06T 2207/10024; G06T 2207/02

See application file for complete search history.

(56) References Cited

U.S. PATENT DOCUMENTS

| | | | |
|---|---|---|---|
| 2004/0264765 A1 | 12/2004 | Ohba | |
| 2009/0109304 A1* | 4/2009 | Guan | H04N 5/23212 348/240.99 |
| 2010/0033617 A1* | 2/2010 | Forutanpour | G06T 7/0067 348/345 |
| 2010/0165152 A1* | 7/2010 | Lim | G06T 5/50 348/240.99 |
| 2011/0043655 A1* | 2/2011 | Park | H04N 5/23212 348/222.1 |
| 2011/0298961 A1* | 12/2011 | Yoshida | G03B 13/36 348/333.01 |
| 2011/0316968 A1 | 12/2011 | Taguchi et al. | |
| 2012/0057040 A1* | 3/2012 | Park | H04N 5/2254 348/222.1 |
| 2012/0069235 A1* | 3/2012 | Imai | H04N 5/23212 348/333.11 |
| 2012/0148109 A1* | 6/2012 | Kawamura | G01C 3/06 382/106 |
| 2014/0176663 A1 | 6/2014 | Cutler et al. | |

OTHER PUBLICATIONS

Ng et al., "Object-Based Coding for Plenoptic Videos", IEEE Tranactions on Circuits and Systems for Video Technology, vol. 20, No. 4, Apr. 2010, pp. 548-562.

Nava et al., "The discrete focal stack transform", Proceeding of European Signal Processing Conference, vol. 8, 2008, pp. 1-5.

Wu et al., "An Object-Based Compression System for a Class of Dynamic Image-Based Representations", Proceedings of the SPIE—The International Society for Optical Engineering, vol. 5960, 2005, pp. 1-9.

Chan et al., "An Object-Based Approach to Image/Video-Based Synthesis and Processing for 3-D and Multiview Televisions", IEEE Transactions on Circuits and Systems for Video Technology, vol. 19, No. 6, Jun. 2009, pp. 821-831.

Silberman et al., "Indoor Segmentation and Support Inference from RGBD Images", 12th European Conference on Coputer Vision 2012, Florence, Italy, Oct. 7, 2012, pp. 1-14.

Luke et al., "Near Real-Time Estimation of Super-Resolved Depth and All-In-Focus Images from a Plenoptic Camera Using Graphics Processing Units", International Journal of Digital Multimedia Broadcasting, vol. 2010, 2010, pp. 1-13.

Wanner et al., "Generating EPI representations of 4D light fields with a single lens focused plenoptic camera", International Symposium on Visual Computing, Las Vegas, Nevada, USA, Sep. 26, 2011, pp. 90-101.

Bishop et al., "Full-Resolution depth map estimation from an aliased plenoptic light field", 10th Asian Conference on Computer Vision, Queenstown, New Zealand, Nov. 8, 2010, pp. 186-200.

* cited by examiner

METHOD AND APPARATUS FOR GENERATING AN ADAPTED SLICE IMAGE FROM A FOCAL STACK

This application claims the benefit, under 35 U.S.C. § 119 of European Patent Application No. 14307106.6, filed Dec. 19, 2014.

FIELD

The present disclosure generally relates to a method and an apparatus for generating an adapted slice image from a focal stack of images.

BACKGROUND

A plenoptic camera is able to measure the amount of light traveling along each bundle of rays that intersects a sensor, by arranging a microlens array between a main lens and the sensor. The light field can be post-processed to reconstruct images of a scene from different viewpoints. The light field image can be used to generate a focal stack which comprises images having different depth. As a result, a user can change a focal point of the images. Compared to a conventional camera, the plenoptic camera can obtain additional optical information components for achieving the reconstruction of the images of the scene from the different viewpoints and depth by post-processing.

In a plenoptic type 1 such as the Lytro light field camera available from Lytro, Inc., an array of microlenses is placed in front of the sensor. All the microlenses of the microlens array have the same focal length and the microlens array is placed one focal length away from the sensor. This configuration enables to obtain maximum angular resolution and low spatial resolution.

Dataset of the light field image or video (e.g. acquired by a plenoptic camera, a camera array or simulated with Computer Generated Imagery (CGI)) is reorganized to form a light data volume in the vicinity of the focal plane of a front lens similar to the light field generated by a lens in the vicinity of its focal plane. Such a focal stack is schematically illustrated in FIG. 1.

A conventional focusing with a camera is simulated by selecting one of the images within the focal stack, which corresponds to moving the focalization plane perpendicularly to the main optical axis of the camera. On the contrary, a light field camera offers the ability to explore pictures from different perspectives and different focal points. Thus, a user of the light field camera can control the focus in unusual way, for example, an intersection plane across the focal stack can be defined to extract a slice image within the focal stack as shown in FIG. 1. Such slice image may provide an "all-in-focus" image along with the intersection plane.

J. P. Luke et al., "Near Real-Time Estimation of Super-Resolved Depth and All-in-Focus Images from a Plenoptic Camera Using Graphics Processing Units", International Journal of Digital Multimedia Broadcasting Volume 2010, mentions that the focal stack can be generated using the light field image and proposes to produce the all-in-focus image from a plenoptic camera.

However, in a case where an object is located on a focal plane in the focal stack, if the intersection plane comes across the object as shown in FIG. 2, the front surface of the left end of the object will be behind the intersection plane by the distance d1 and the front surface of the right end of the object will be ahead of the intersection plane by the distance d2. Due to these distances between the object on the focal plane and the intersection plane, both ends of the object will be blurred in the image focused on the slice image after the refocusing process for the slice image is made.

SUMMARY

According to an aspect of the present disclosure, an apparatus for generating an adapted slice image from a focal stack of refocused images using an all-in-focus image derived from the focal stack may comprise a processor configured to: select a slice image in the focal stack; select at least one object in the all-in-focus image to be focused in the adapted slice image; and generate the adapted slice image by combining the selected at least one object in the all-in-focus image onto the selected slice image.

According to another aspect of the present disclosure, a method for generating an adapted slice image from a focal stack of refocused images using an all-in-focus image in which objects appear in-focus which is derived from the focal stack may comprise: selecting a slice image in the focal stack; selecting at least one object in the all-in-focus image to be focused in the adapted slice image; and generating the adapted slice image by combining the selected at least one object in the all-in-focus image onto the selected slice image.

According to another aspect of the present disclosure, a computer program product downloadable from a communication network and/or recorded on a medium readable by computer and/or executable by a processor, may comprise program code instructions for implementing a method according to the present disclosure.

According to yet another aspect of the present disclosure, a non-transitory computer-readable medium may comprise a computer program product recorded thereon and capable of being run by a processor, including program code instructions for implementing a method according to the present disclosure.

The object and advantages of the present disclosure will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described with reference to the accompanying drawings.

A description will now be given of a method, an apparatus, and a computer-readable storage medium for obtaining an adapted slice image from a focal stack, in each embodiment according to the present disclosure.

Figure 1:
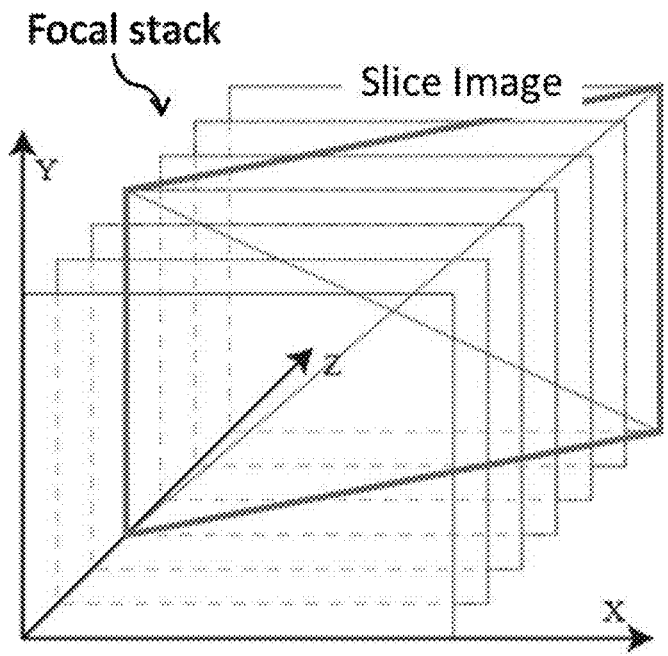
FIG. 1 is a diagram illustrating an example of a slice image within a focal stack.
Figure 2:
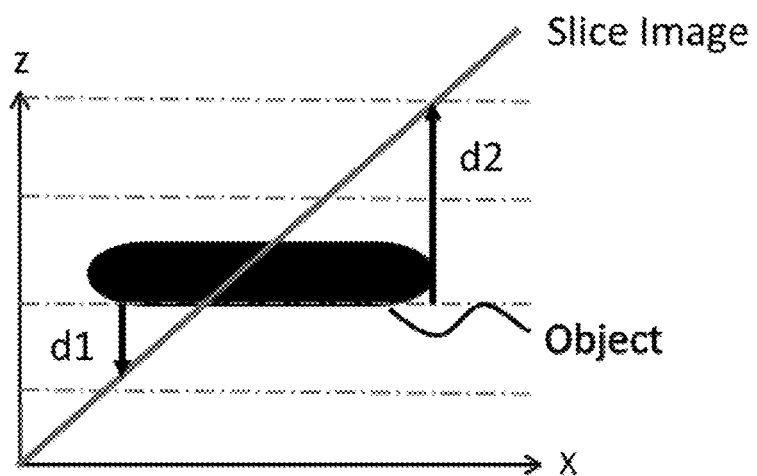
FIG. 2 is a diagram illustrating an object located on a focal plane in the focal stack and the slice image coming across the object.
Figure 3:
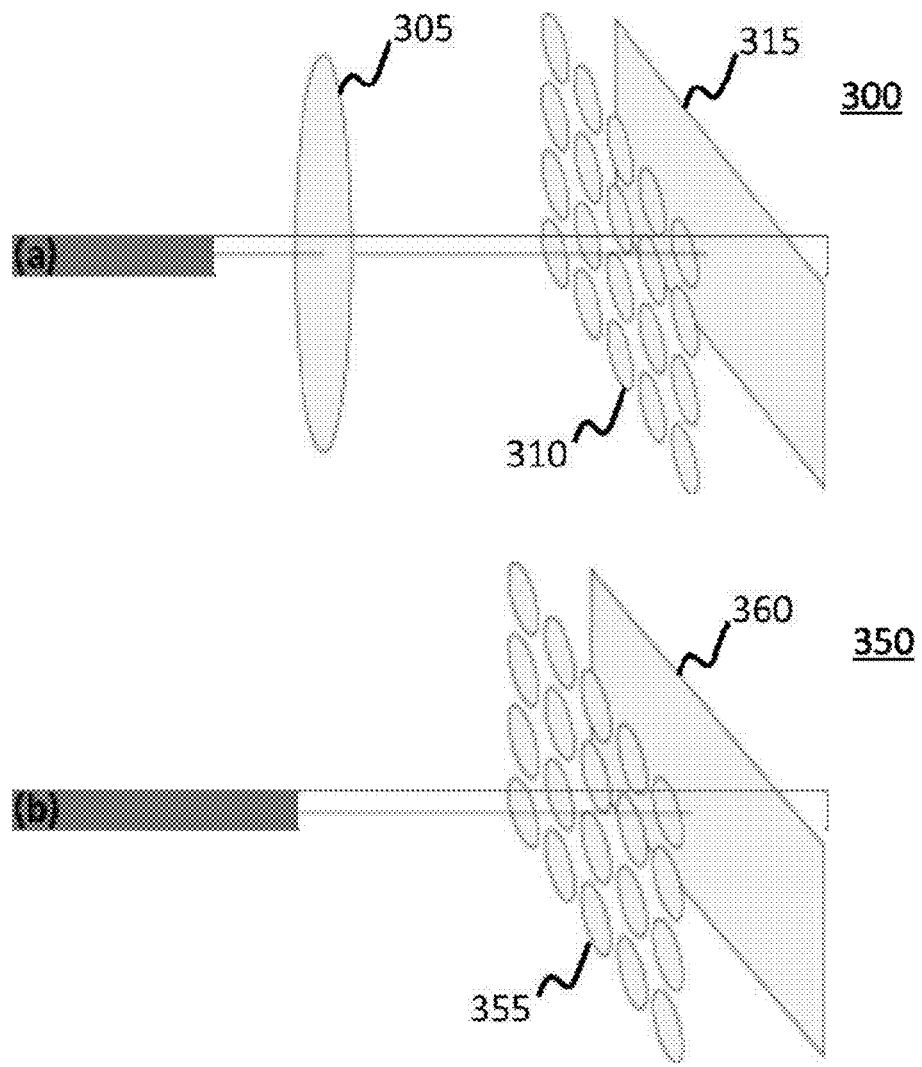
FIG. 3 is a diagram illustrating examples of a plenoptic camera and a multi-array camera.

1) Light Field Cameras:

FIG. 3 is a diagram illustrating examples of a plenoptic camera and a multi-array camera. Light-field cameras are capable of recording 4D light-field data. For instance, 4D light-field cameras may be: a plenoptic camera 300 comprising a main lens 305, a microlens array 310 and an image sensor 315 (FIG. 3(*a*)); or a multi-array camera 350 comprising a lens array 355 and a single image sensor 360 (FIG. 3(*b*)).

In the example of the plenoptic camera 300 as shown in FIG. 3(*a*), the main lens 305 receives light from an object (not shown) in an object field of the main lens 305 and passes the light through an image field of the main lens 305. The microlens array 310 includes a plurality of microlenses 315 arranged in a two-dimensional array.

Figure 4:
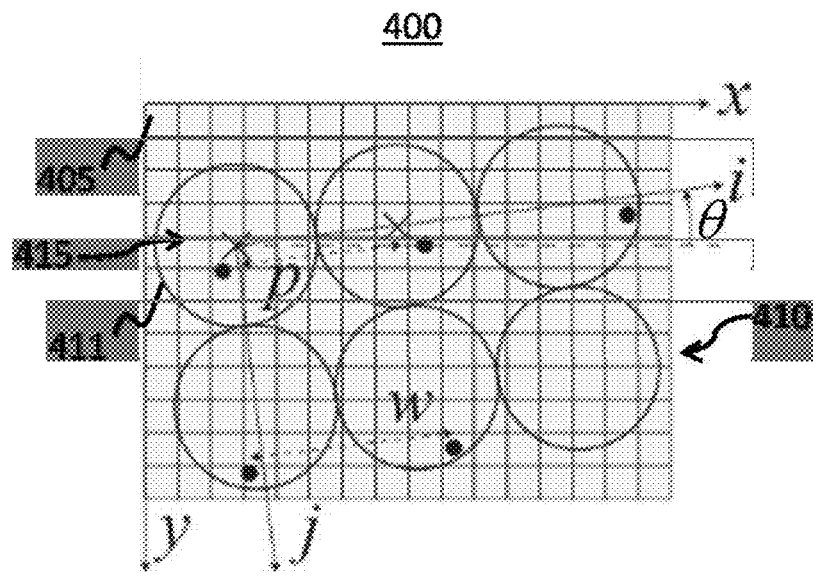
FIG. 4 is a plan view schematically illustrating an example of sensor regions arranged on the sensing surface of the image sensor.

FIG. 4 is a plan view schematically illustrating an example of sensor regions arranged on the sensing surface of the image sensor. As illustrated in FIG. 4, the image sensor 400 includes a plurality of pixels 405 arranged in a two-dimensional array, and receives the light from the object through the microlens array 410. Each of the microlenses 411 of the microlens array 410 has the lens properties to direct the light to a circular area 415 on the image sensor 400. An outer contour of the circular area 415 may represent the shape of a microlens image formed and captured on the image sensor 400, which shape depends on the shape of the microlens 411. Amongst all of the pixels 405 on the image sensor 400, only the pixels 405 located substantially inside the circular area 415 contribute to the imaging. In other words, a pixel area (or sensing area) of each pixel 405 that contributes to the imaging is located substantially inside the circular area 415.

The image sensor 400 of light-field camera records an image comprising a collection of 2D microlens images arranged within a 2D image. Each microlens 411 of the microlens array 410 forms a microlens image represented by a circular area 415. Coordinates of pixels 405 on the sensor 400 is indicated by (x, y) in the x-y coordinate system on the surface of the image sensor 400 as shown in FIG. 4. The distance p shown in FIG. 4 is the distance between the two consecutive microlens images. Microlenses 411 are chosen such that the distance p is larger than the size of pixel 405. The distance w shown in FIG. 4 is the disparity distance between the two consecutive microlens images. Microlens images are referred by their respective coordinate (i, j) in the i-j coordinate system on the surface of the image sensor 400 as shown in FIG. 4.

As mentioned above, only the pixels 405 located substantially inside the circular area 415 receive the light through the microlens 411. The inter microlens space may be masked out to prevent photons to pass outside a microlens 411 (if the microlenses 411 have a square shape and the inter microlens space is not formed, such a masking is not needed).

The center of a microlens image (i, j) is located on the image sensor 400 at the coordinate $(x_{i,j}, y_{i,j})$. The θ in FIG. 4 represents the angle between the square lattice of pixels 405 and the square lattice of microlenses 411. The coordinate $(x_{i,j}, y_{i,j})$ can be deduced by the following equation (1) considering $(x_{0,0}, y_{0,0})$ which is the pixel coordinate of the microlens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

The distances p and w are given in unit of pixel. They are converted into physical unit of distance (meters) P and W, respectively, by multiplying the pixel size δ: W=δw and P=δp. These distances depend on the characteristics of the light field camera.

Figure 5:
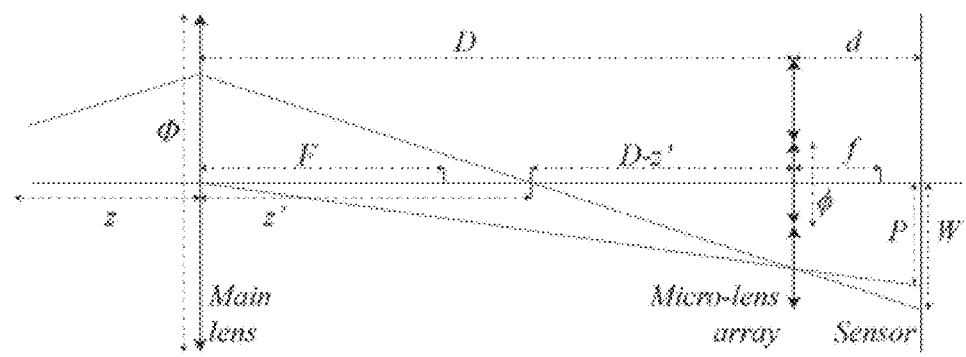
FIG. 5 illustrates a schematic light field camera comprising an ideal, perfect thin lens model.

2) Optical Properties of a Light Field Camera:

Here, exemplary optical properties of a light field camera will be discussed with reference to FIG. 5 which illustrates a schematic light field camera comprising an ideal, perfect thin lens model.

The main lens has a focal length F and an aperture Φ. The microlens array comprises microlenses having a focal length f. The pitch of the microlens array is ϕ. The microlens array is located at a distance D from the main lens and at a distance d from the sensor. The object (not shown) is located at a distance z from the main lens. This object is focused by the main lens at a distance z' from the main lens. FIG. 5 illustrates the case where D>z'. In this case, microlens images can be in-focus on the sensor depending on d and f.

The disparity W varies with the distance z between the object (not shown) and the main lens. To establish the relation between W and z, it may rely on the thin lens equation (2) and the Thales law equation (3):

$$\frac{1}{z} + \frac{1}{z'} = \frac{1}{F} \quad (2)$$

$$\frac{D-z'}{\phi} = \frac{D-z'+d}{W} \quad (3)$$

Then, the following equation (4) is deduced by mixing the equations (2) and (3).

$$W = \phi \left( 1 + \frac{d}{D - \frac{zF}{z-F}} \right) \quad (4)$$

The relation between W and z are not on the assumption that the microlens images are in-focus. Microlens images are strictly in-focus according to the thin lens equation:

$$\frac{1}{D-z'} + \frac{1}{d} = \frac{1}{f} \quad (5)$$

3) Image Re-Focusing:

A major property of the light-field camera is the possibility to compute 2D re-focused images where the re-focalization distance is freely adjustable after the shot of the images. The 4D light-field image L of size $[N_x, N_y]$ is projected into a 2D image by just shifting and zooming microlens images and then summing them into a 2D image. The amount of shift of the microlens images controls the re-focalization distance. The projection of the 4D light field pixel L(x, y, i, j) into the re-focused 2D image coordinate (X, Y) is defined by:

$$\begin{bmatrix} X \\ Y \end{bmatrix} = sg\left(\begin{bmatrix} x \\ y \end{bmatrix} - \begin{bmatrix} x_{i,j} \\ y_{i,j} \end{bmatrix}\right) + s\begin{bmatrix} x_{i,j} \\ y_{i,j} \end{bmatrix} \quad (6)$$

where s controls the size of the 2D re-focused image, and g controls the focalization distance of the re-focused image. This equation (7) can be rewritten as equation (7) by considering equation (1):

$$\begin{bmatrix} X \\ Y \end{bmatrix} = sg\begin{bmatrix} x \\ y \end{bmatrix} + sp(1-g)\begin{bmatrix} \cos\theta & -\sin\theta \\ \sin\theta & \cos\theta \end{bmatrix}\begin{bmatrix} i \\ j \end{bmatrix} + s(1-g)\begin{bmatrix} x_{0,0} \\ y_{0,0} \end{bmatrix} \quad (7)$$

The parameter g can be expressed as function of p and w as equation (8). The parameter g represents the zoom that must be performed on the microlens images, using their centers as reference, such that the various zoomed views of the same objects get superposed.

$$g = \frac{p}{p-w} \quad (8)$$

Equation (7) becomes:

$$\begin{bmatrix} X \\ Y \end{bmatrix} = sg\begin{bmatrix} x \\ y \end{bmatrix} - sgw\begin{bmatrix} \cos\theta & -\sin\theta \\ \sin\theta & \cos\theta \end{bmatrix}\begin{bmatrix} i \\ j \end{bmatrix} + \frac{sgw}{p}\begin{bmatrix} x_{0,0} \\ y_{0,0} \end{bmatrix} \quad (9)$$

The 4D light field pixels (x, y, i, j) are projected into the 2D refocused image. Preliminarily, a refocused image R and a refocused image weight $R_{weight}$ are set to 0. The size of the refocused images $[N_X, N_Y]=[sN_x, sN_y]$ is set to s times the size of the 4D light field image. The projection is performed by summing the projected pixels at the coordinate (X, Y) into the re-focused image. For each projected 4D light-field pixels, the refocused image weight is updated by adding 1 at the pixel coordinate (X, Y):

$$R(X,Y) += L(x,y,i,j) W(X,Y) += 1 \quad (10)$$

The refocused image weight represents how many 4D light field pixels have been projected for coordinate (X, Y). After projecting all 4D light-field pixels of L, the refocused image R is divided by the refocused image weight $R_{weight}$. This last step harmonizes the number of pixels received for coordinate (X, Y).

Since the projected coordinates (X, Y) are not necessarily integer coordinates, interpolation technique can be optionally used to map a non-integer pixel coordinate (X, Y) into the grid of the refocused image R and refocused image weight $R_{weight}$. Interpolation techniques are commonly used and exemplary descriptions can be found in the page of "Bilinear interpolation" in the Wikipedia, for example. Thus detailed explanation on the interpolation technique is omitted in this description.

4) Focal Stack:

A focal stack is a collection of N re-focused images $R_n$ (with n∈[1, N]) which define a cube of images, where N is a user selected number of images. The N re-focused images are computed for g varying linearly between $g_{min}$ and $g_{max}$ corresponding to a range of focalization distances between $z_{min}$ and $z_{max}$ defined by equations (4) and (8). Another option is to compute the focal stack with w varying linearly from $w_{min}$ and $w_{max}$ corresponding to a range of focalization distances between $z_{min}$ and $z_{max}$ defined by equation (4). The min max boundaries of g or w are defined by the user in order to encompass re-focused images with a focalization distance within $z_{min}$ and $z_{max}$.

The computation of the focal stack described in this embodiment is on the assumption that a 4D light field is recorded by a single image sensor with a lens array and optionally a main lens. However, the computation of a focal stack is not limited to the 4D light field recorded by such type of light-field camera, therefore it should be noted that it is possible to compute a focal stack of re-focused images based on the 4D light field recorded by any types of light field cameras.

5) Depth-Map Estimation:

Using the focal stack, it is possible to estimate the distance of the object being observed in the image. The depth-map image Z has the size of the re-focused images $R_n$. The depth-map image Z is estimated with the focal stack by comparing the sharpness of a pixel (x, y) from the refocused image $R_n(X, Y)$ with the previous and next re-focused images $R_{n-1}$ and $R_{n+1}$. For example, if pixel $R_n(X, Y)$ is sharper than those in the previous re-focused image $R_{n-1}$ and next re-focused image $R_{n+1}$, then the depth-map image is actualized by Z(X, Y)=n based on the pixel (x, y) from the refocused image $R_n(X, Y)$. The depth-map is estimated for all pixels (X, Y) belonging to $(N_X, N_Y)$.

The sharpness $S_n(X, Y)$ of the pixel $R_n(X, Y)$ is estimated by for instance computing the amount of energy in the high frequencies for pixels around $R_n(X, Y)$. The sharpness $S_n(X, Y)$ can be expressed as:

$$S_n(X,Y) = (-R_n(X-1,Y) - R_n(X+1,Y) - R_n(X,Y-1) - R_n(X,Y+1) + 4R_n(X,Y))^2. \quad (11)$$

6) All-in-Focus Image:

The all-in-focus image $R_{all}$ can be obtained by the depth map image Z. The all-in-focus image $R_{all}$ corresponds to a re-focused image in which all objects appear in-focus. The all-in-focus image $R_{all}$ is obtained by collecting the pixels within the focal stack by considering the indices given by the depth map image Z at a given pixel location (x, y), that is: $R_{all}(X, Y) = R_{Z(X,Y)}(X, Y)$.

7) Slice Image:

A 2D slice image $R_{slice}$ to be re-focused can be obtained by defining an intersection plane across at least two images in the focal stack. The coordinate of the slice image is specified by its normal in the coordinate system of the focal stack, which normal is given by the user to select the refocused slice image $R_{slice}$.

8) Selection of Object(s) to be Focused from the Slice Image and the all-in-Focus Image:

According to an embodiment of the present disclosure, an approach to obtain a re-focused, adapted slice image is provided to the user, which re-focused image is made by selecting at least one object to be focused from the all-in-focus image $R_{all}$ using a Graphical User Interface (GUI) on a display on an apparatus.

Figure 6:
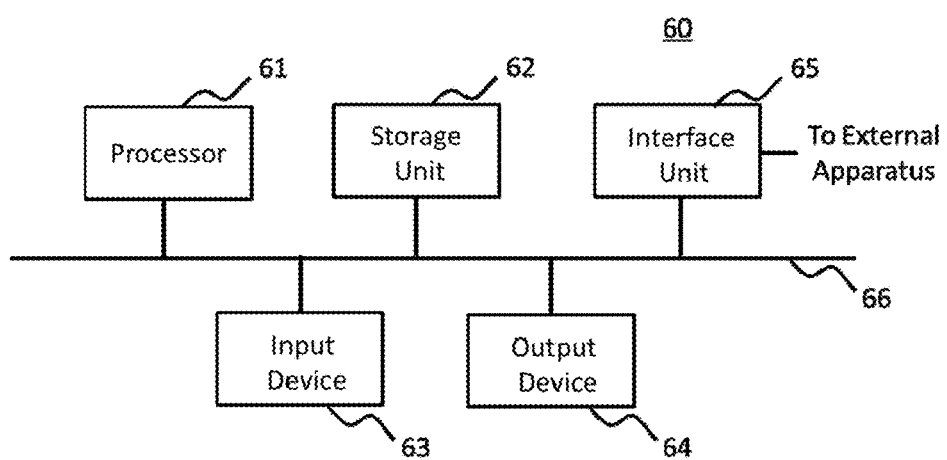
FIG. 6 is a schematic block diagram illustrating an example of an apparatus for generating an adapted slice image from a focal stack according to an embodiment of the present disclosure.

FIG. 6 is a schematic block diagram illustrating an example of an apparatus for generating an adapted slice image from a focal stack according to an embodiment of the present disclosure.

An apparatus 60 illustrated in FIG. 6 includes a processor 61, a storage unit 62, an input device 63, a display device 64, and an interface unit 65 which are connected by a bus 66. Of course, constituent elements of the computer apparatus 60 may be connected by a connection other than a bus connection using the bus 66.

The processor 61 controls operations of the apparatus 60. The storage unit 62 stores at least one program to be executed by the processor 61, and various data, including data of the 4D light field images captured and provided by a light field camera, parameters used by computations performed by the processor 61, intermediate data of computations performed by the processor 61, and so on. The processor 61 may be formed by any known and suitable hardware, or software, or a combination of hardware and software. For example, the processor 61 may be formed by dedicated hardware such as a processing circuit, or by a programmable processing unit such as a CPU (Central Processing Unit) that executes a program stored in a memory thereof.

The storage unit 62 may be formed by any suitable storage or means capable of storing the program, data, or the like in a computer-readable manner. Examples of the storage unit 62 include non-transitory computer-readable storage media such as semiconductor memory devices, and magnetic, optical, or magneto-optical recording media loaded into a read and write unit. The program causes the processor 61 to perform a process for obtaining an adapted slice image from a focal stack according to an embodiment of the present disclosure as described hereinafter with reference to FIG. 7.

The input device 63 may be formed by a keyboard, a pointing device such as a mouse, or the like for use by the user to input commands, to make user's selections of portions within images to be focused. The output device 64 may be formed by a display device to display, for example, a Graphical User Interface (GUI), images of the focal stack, a slice image and a depth map image. The input device 63 and the output device 64 may be formed integrally by a touch-screen panel, for example.

The interface unit 65 provides an interface between the apparatus 60 and an external apparatus. The interface unit 65 may be communicable with the external apparatus via cable or wireless communication. In this embodiment, the external apparatus may be a light field camera. In this case, data of 4D light field images captured by the light field camera can be input from the light field camera to the apparatus 60 through the interface unit 65, then stored in the storage unit 62.

In this embodiment the apparatus 60 is exemplary discussed as it is separated from the light field camera and they are communicable each other via cable or wireless communication, however it should be noted that the apparatus 60 can be integrated with such a light field camera.

Figure 7:
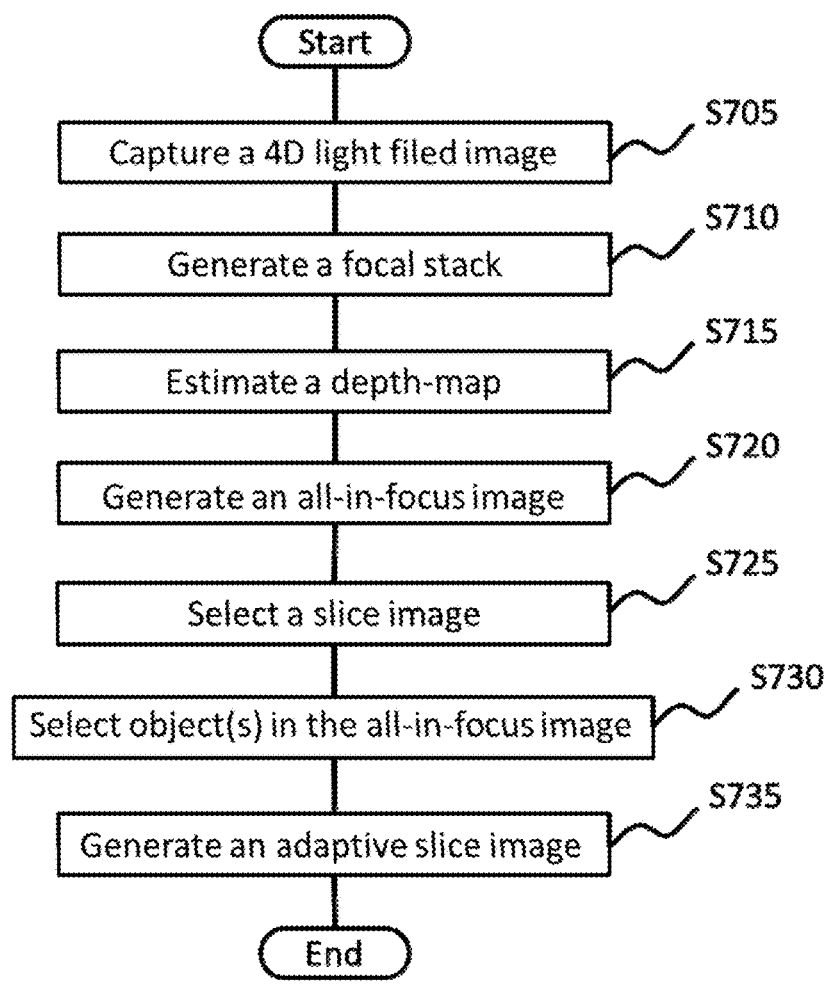
FIG. 7 is a flow chart for explaining a process for obtaining an adapted slice image from a focal stack according to an embodiment of the present disclosure.

FIG. 7 is a flow chart for explaining a process for generating an adapted slice image from a focal stack according to an embodiment of the present disclosure.

At step S705 illustrated in FIG. 7, a 4D light field image of a scene is captured by a user with a light field camera. The captured 4D light field image data is transferred from the light field camera to the apparatus 60 (FIG. 6) via the interface unit 65, then stored into the storage unit 62 of the apparatus. Such a data transfer may be controlled by the processor 61 of the apparatus 60. In the case where the apparatus 60 is integrated with the light field camera, the captured light field image data may be directly stored into the storage unit 62.

At step S710, the processor 61 of the apparatus 60 computes, based on the 4D light field image data, 2D re-focused images $R_n$ having different re-focalization distance in the scene to build a focal stack of the N re-focused images R. Generating the 2D re-focused images R and the focal stack of the re-focused images $R_n$ can be performed as described above in the sections of "3) Image re-focusing" and "4) Focal stack". The generated focal stack data is stored in the storage unit 62.

At step S715, the processor 61 generates a depth-map image Z of the scene using the focal stack of the re-focused images $R_n$ as described in the section "5) Depth-map estimation". A computation of depth map is also known by N. Sabater et al., "Accurate Disparity Estimation for Plenoptic Images", ICCP 2014. It should be noted that a segmentation of the objects in the depth-map image Z is also performed in this step S715. According this segmentation process, objects having their respective depths in the depth-map image Z are segmented. Groups of pixels G belonging to each objected may be grouped and associated with the respective objects. Such objects segmentation process is known by Nathan Silberman et al., "Indoor Segmentation and Support Inference from RGBD Images", ECCV-12, thus details of the segmentation process are not discussed in this disclosure. The depth-map image Z data and the objects segmentation information are stored in the storage unit 62.

At step S720, the processor 61 generates the all-in-focus image $R_{all}$ based on the depth map image Z as described in the section "6) All-in-focus image". In the all-in-focus image $R_{all}$, all objects in the image appear in-focus, which objects have been segmented as described above. The generated all-in-focus image $R_{all}$ data is stored in the storage unit 62.

The steps S705 through S720 can be performed automatically by the processor 61 after the 4D light field image data is provided to the apparatus 60.

At step S725, the processor 61 executes a first GUI (Graphical User Interface) function on the display 64 and may additionally display the focal stack of the re-focused images. The first GUI function allows the user to select a slice image $R_{slice}$ crossing the focal stack. The slice image $R_{slice}$ can be selected by defining an intersection plane across at least two images in the focal stack on the GUI. As described in the section "7) Slice image", the coordinate of the slice image $R_{slice}$ is specified by its normal in the coordinate system of the focal stack, which normal is given by the user to select the refocused slice image $R_{slice}$. The selected slice image $R_{slice}$ data is stored in the storage unit 62.

At step S730, the processor 61 executes a second GUI function on the display 64 and displays the all-in-focus image $R_{all}$ on the display 64. The second GUI function allows the user to select object(s) in the displayed all-in-focus image $R_{all}$ which are to be focused on the refocused slice image $R_{slice}$. As discussed above with respect to the step S715, since the objects have been segmented and pixels belonging to respective objects are grouped and associated to the respective objects, user's selection of the object on the GUI on the display 64 can be made by pointing any pixel within the group of pixels G associated with the object using the input device 63. The selection information of the object(s) is stored in the storage unit 62.

At step S735, the processor 61 generates a re-focused, adapted slice image $R_{user}$ by combining the in-focus image of the object(s) selected in step S730 onto the slice image $R_{slice}$ selected in step S725. The re-focused adapted slice image $R_{user}$ may correspond to the slice image $R_{slice}$ for pixels (X, Y) which do not belong to the pixels G, else $$R_{user}(X, Y) = \begin{cases} R_{all} & \text{if } (X, Y) \in G \\ R_{slice} & \text{else} \end{cases} \quad (11)$$

Figure 8:
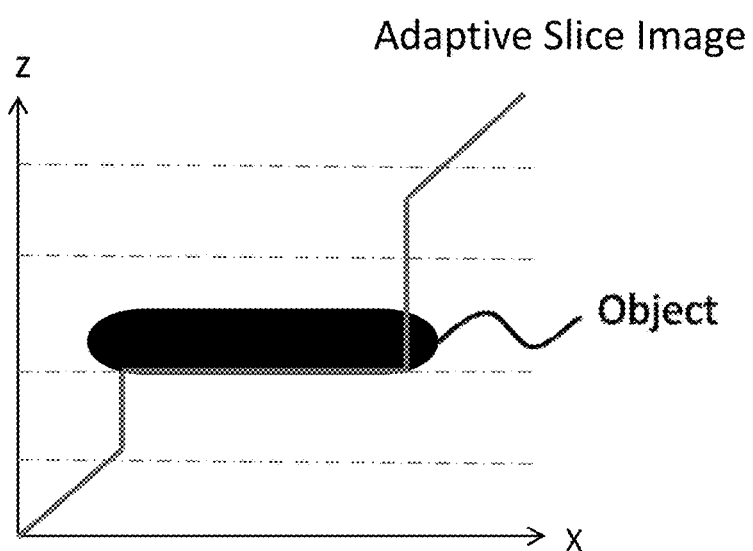
FIG. 8 is a diagram illustrating an example of an adapted slice image generated from a focal stack according to an embodiment of the present disclosure.

FIG. 8 is a diagram illustrating an example of an adapted slice image generated from a focal stack according to an embodiment of the present disclosure. As shown in FIG. 8, the originally selected slice image has been modified to generate the adapted slice image so that the selected object appears in-focus on the adapted slice image. In this sense, it should be noted that the term "adapted slice image" used in this disclosure can be interpreted as a modified image of an originally selected slice image in which the selected object appears in-focus.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the present principles. Although the embodiments of the present disclosure have been described in detail, it should be understood that the various changes, substitutions, and alterations could be made hereto without departing from the scope of the disclosure.

The invention claimed is:

1. An apparatus for generating an adapted slice image from a focal stack using an all-in-focus image derived from the focal stack, the apparatus comprising:
   a processor configured to:
   select a slice image in the focal stack, wherein the slice image is an intersection plane across the focal stack, wherein the focal stack is a collection of refocused images which define a cube of images,
   select at least one object in the all-in-focus image to be focused in the adapted slice image, wherein the all-in-focus image is an image in which all the objects appear in focus, and
   generate the adapted slice image by combining the selected at least one object in the all-in-focus image onto the selected slice image, wherein the adapted slice image is a modified version of the slice image in which the at least one object appears in focus.

2. The apparatus as claimed in claim 1, wherein the processor is further configured to generate the all-in-focus image by estimating a depth-map image using the focal stack and generating the all-in-focus image based on the depth-map image.

3. The apparatus as claimed in claim 2, wherein the processor is further configured to segment the at least one object in the depth-map image, wherein the at least one object has respective depths in the depth-map image.

4. The apparatus as claimed in claim 3, wherein the processor is further configured to group pixels belonging to an object to associate the group of pixels with the object.

5. The apparatus as claimed in claim 4, wherein the processor is further configured to select the at least one object by selecting any pixel in the group of pixels belonging to the object.

6. A method for generating an adapted slice image from a focal stack using an all-in-focus image derived from the focal stack, the method comprising:
   selecting a slice image in the focal stack, wherein the slice image is an intersection plane across the focal stack, wherein the focal stack is a collection of refocused images which define a cube of images,
   selecting at least one object in the all-in-focus image to be focused in the adapted slice image, wherein the all-in-focus image is an image in which all the objects appear in focus, and
   generating the adapted slice image by combining the selected at least one object in the all-in-focus image onto the selected slice image, wherein the adapted slice image is a modified version of the slice image in which the at least one object appears in focus.

7. The method as claimed in claim 6, wherein the method further comprises estimating a depth-map image using the focal stack and generating the all-in-focus image based on the depth-map image.

8. The method as claimed in claim 7, wherein the estimating further comprises segmenting the at least one object in the depth-map image, wherein the at least one object has respective depths in the depth-map image.

9. The method as claimed in claim 8, wherein the segmenting further comprises grouping pixels belonging to an object to associate the group of pixels with the object.

10. The method as claimed in claim 9, wherein the selecting at least one object in the all-in-focus image further comprises selecting any pixel in the group of pixels belonging to the at least one object.

11. A non-transitory computer-readable medium comprising a computer program product recorded on a processor and capable of being run by the processor, including program code instructions for implementing a method according to claim 6.

* * * * *